United States Patent
Dettenberger et al.

(10) Patent No.: US 10,738,857 B2
(45) Date of Patent: Aug. 11, 2020

(54) ACTUATOR WITH REVERSIBLE DIRECTION OF ROTATION

(71) Applicant: OECHSLER AG, Ansbach (DE)

(72) Inventors: Stefan Dettenberger, Ansbach (DE); Daniel Motzet, Ansbach (DE)

(73) Assignee: OECHSLER AG, Ansbach (DE)

(*) Notice: Subject to any disclaimer, the term of this patent is extended or adjusted under 35 U.S.C. 154(b) by 0 days.

(21) Appl. No.: 16/214,261

(22) Filed: Dec. 10, 2018

(65) Prior Publication Data
US 2019/0178347 A1 Jun. 13, 2019

(30) Foreign Application Priority Data
Dec. 11, 2017 (DE) .................. 10 2017 011 397

(51) Int. Cl.
| | | |
|---|---|---|
| F16H 37/04 | (2006.01) | |
| F16H 3/00 | (2006.01) | |
| H02K 7/10 | (2006.01) | |
| F16D 41/063 | (2006.01) | |
| F16D 41/066 | (2006.01) | |
| H02K 7/02 | (2006.01) | |
| H02K 7/116 | (2006.01) | |

(52) U.S. Cl.
CPC ........... *F16H 3/005* (2013.01); *F16D 41/063* (2013.01); *F16D 41/066* (2013.01); *F16H 37/04* (2013.01); *H02K 7/02* (2013.01); *H02K 7/10* (2013.01); *H02K 7/116* (2013.01)

(58) Field of Classification Search
CPC ...... F16D 41/063; F16D 41/066; F16H 3/005; F16H 37/04; H02K 7/02; H02K 7/10; H02K 7/116

USPC ......... 475/12; 74/810.1; 192/43, 48.92, 45.1
See application file for complete search history.

(56) References Cited

U.S. PATENT DOCUMENTS

| | | | | |
|---|---|---|---|---|
| 2,903,901 A | * | 9/1959 | MacDonald | F16H 3/003 74/368 |
| 4,327,822 A | | 5/1982 | Voegele et al. | |
| 4,341,294 A | | 7/1982 | Kerr | |
| 4,352,979 A | * | 10/1982 | Knecht | G01R 11/02 235/91 A |
| 4,598,621 A | * | 7/1986 | Weinhold | G01N 1/06 475/12 |

(Continued)

FOREIGN PATENT DOCUMENTS

| | | |
|---|---|---|
| DE | 27 58 841 A1 | 7/1979 |
| DE | 43 23 114 A1 | 1/1995 |

(Continued)

*Primary Examiner* — Leslie A Nicholson, III
(74) *Attorney, Agent, or Firm* — Collard & Roe, P.C.

(57) ABSTRACT

In an actuator having a reversible motor before a step-down gear, this can be optimized kinetically, geometrically and in terms of material engineering when different step-down ratios become active according to the different torque requirement for application and for release, in a manner dependent on direction of rotation, for example of a parking brake operated by an electric motor. For this purpose, two differently dimensioned idler wheels of the step-down gears that mesh, for example, with a stepped motor pinion, act via freewheels acting in opposite directions on a common gear shaft. Depending on direction of rotation of the motor, the gear shaft thereby rotates at different rpms, delivering correspondingly different torques.

8 Claims, 2 Drawing Sheets

(56) References Cited

U.S. PATENT DOCUMENTS

| | | | |
|---|---|---|---|
| 5,557,987 A | | 9/1996 | Loetsch |
| 6,165,099 A | * | 12/2000 | Pieper ............... F16H 3/005 |
| | | | 475/305 |
| 6,353,957 B1 | * | 3/2002 | Wolfe ............... F16H 3/003 |
| | | | 15/49.1 |
| 6,390,409 B1 | * | 5/2002 | Hogberg ............ B65H 19/1815 |
| | | | 242/420.6 |

FOREIGN PATENT DOCUMENTS

| | | |
|---|---|---|
| DE | 198 24 115 A1 | 2/1999 |
| DE | 10 2009 007 887 B3 | 9/2010 |
| DE | 10 2013 206 811 A1 | 10/2014 |
| DE | 10 2015 006 118 A1 | 11/2016 |
| DE | 10 2015 008 568 A1 | 1/2017 |

\* cited by examiner

ACTUATOR WITH REVERSIBLE DIRECTION OF ROTATION

CROSS REFERENCE TO RELATED APPLICATIONS

Applicant claims priority under 35 U.S.C. § 119 of German Application No. 10 2017 011 397.1 filed on Dec. 11, 2017, the disclosure of which is incorporated by reference.

BACKGROUND OF THE INVENTION

1. Field of the Invention

The invention relates to an actuator.

2. Description of the Related Art

In the present connection, an actuator will be understood as the combination of a particularly compact high-speed reversible electric motor with a step-down gear for influencing the torque of an actuator power take-off, which has the form, for example, of a shaft or of a toothed wheel or belt wheel. This power take-off may operate a utility function, which in the case of comfort functions in the motor vehicle may be, for example, a window lifter, a seat belt presenter (see DE 10 2015 006 118 A1) or especially a parking brake operated by an electric motor (see DE 10 2009 007 887 B3 and DE 10 2015 008 568 A1).

It is common to such utility functions that different loads have to be controlled depending on direction of movement, for example for tightening or loosening a seat belt or for applying or releasing a brake piston.

SUMMARY OF THE INVENTION

In connection therewith, the present invention is based on the idea that it would be advantageous if two torques were to be available to the actuator at its power take-off in a manner dependent on the direction of rotation, namely—in relation to the parking brake, for example—on the one hand a higher torque for strong application and on the other hand for rapid release at a speed that in contrast is higher, with correspondingly reduced torque. Building on this, the invention is based on the technical problem of improving the kinetics of the application and release sequence by means of such actuators.

This task is accomplished according to the invention by the cooperation of the important features specified in the main claim. Accordingly, the actuator gear is able to operate as a function of the instantaneous load situation, i.e. in a manner dependent on the direction of rotation, with different step-down ratios, namely with high step-down ratio and high resulting torque, for example, for relatively slow but strong application and, in reversed direction of rotation of the actuator, with lower rpm step-down ratio for desirable faster release, in which especially only static-friction phenomena have to be overcome within the utility function by the actuator torque.

According to a particularly expedient further development of the approach according to the invention, a change-over, in a manner dependent on the direction of rotation, between two gears designed for different step-down ratios takes place by means of two oppositely turning freewheels acting between a gear shaft common to both gears on the one hand and two idler wheels with different step-down ratios on the other hand. Thereby two idler wheels are always being driven, but only one—due to its freewheel that is blocking in this direction of rotation—transmits a torque to the gear shaft, while in this direction of rotation the other idler wheel also turns freely due to open freewheel without coupling to the gear shaft.

A further advantage of the approach according to the invention stems from the fact that especially the idler wheels of the two gears may be designed and thus optimized, with respect to materials and teeth geometry, for example, for different loads in a manner dependent on the direction of rotation. This is so because, depending on the direction of rotation, the one gear that steps down strongly is always mechanically loaded only strongly and, in alternation therewith, the other gear that steps down more weakly is always mechanically loaded only weakly.

As an example, the needle freewheels that have little radial bearing capacity found in bicycles may be inserted between the idler wheels and the gear shaft common to them. Provided sufficient installation space for the actuator is available around the gear shaft, the more inexpensive type of each clamping-element freewheel is expediently chosen here for each of the two alternative directions of rotation of the idler wheels. According to this further development of the invention, for which independent protection is also claimed, such a clamping-element freewheel is designed as a cam having a sickle-like cross section.

The respective cam is situated in an annular space between the gear shaft and that of the two idler wheels assigned to it. A tapering end of this cam is fixed flexibly on the idler wheel. Toward the opposite, unattached end face—partly embracing the gear shaft—the cross section of the cam increases. This freewheel blocks when the sickle-like cam is urged compressively toward the gear shaft by its idler wheel. This is so because then the cam is wedged in the annular space between the idler wheel and the gear shaft, and the gear shaft is entrained in rotation by the idler wheel. The freewheel reopens when the cam is moved backward by the idler wheel relative to the gear shaft and thereby is lifted from the gear shaft. A stop in the idler wheel that comes into contact against the end of the cam during this backward direction of rotation supports and stabilizes the lifting of the now unburdened cam from the gear shaft. The gear shaft would now be free to rotate if it were not wedged by and together with the oppositely oriented cam of the other idler wheel, where it is now consequently entrained in backward direction of rotation.

BRIEF DESCRIPTION OF THE DRAWINGS

Additional further developments and modifications of the approach according to the invention will become evident from the further claims and also, with consideration of their advantages, from the following description of preferred exemplary embodiments of the invention. In the drawing, where the essentials of the functions are sketched abstractly and not to scale.

DETAILED DESCRIPTION OF PREFERRED EMBODIMENTS

Figure 1:
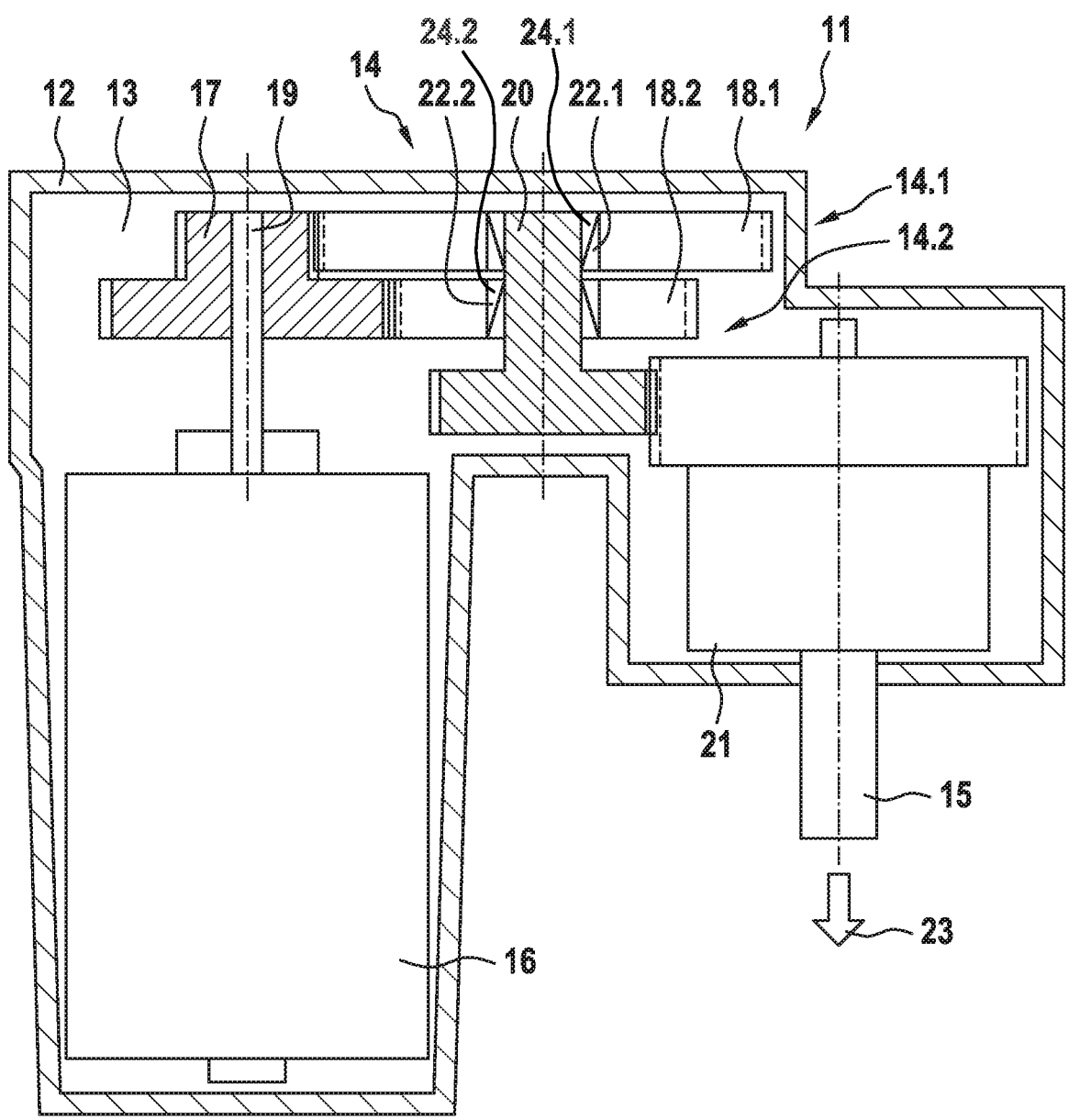
FIG. 1 shows, for functional parts projected into the plane of the drawing, an actuator with opened casing in axial longitudinal section.

In this exemplary embodiment, the actuator 11 designed according to the invention has, connected operatively to one another inside a casing 12, a drive 13, two gears 14 (14.1 and 14.2) and a power take-off 15. As an example of the drive 13, a high-speed direct-current motor 16 is provided that has reversible direction of rotation and mechanical or preferably electronic commutation. For different step-down ratios, two serrated idler wheels 18 (18.1 and 18.2) of different diameters, which are functional parts of the two gears 14.1 and 14.2 respectively, are in engagement with a step-down stage following the motor 16 or, as sketched, directly with its pinion 17. As sketched, the diameter of this pinion 17 in axial direction is radially stepped in such a way that, with drive and gear shafts 19, 20 parallel to one another, its smaller diameter meshes with the larger idler wheel 18.1 for stronger step-down effect, whereas the smaller idler wheel 18.2 meshes with the larger diameter of the pinion 17 for weaker step-down effect. The gear shaft 20 connected via the idler wheel 18 to rotate together with the pinion 17 drives the power take-off 15, and if necessary for further torque increase does so via a further step-down gear, which is designed here as a one-stage or multi-stage planetary gear 21.

However, the driving of the idler wheel 18 may also take place via an upstream gear stage instead of directly by the motor pinion 17. Whether a further gear stage, especially a one-stage or multi-stage planetary gear, is connected upstream from the power take-off 15, is to be decided in load-dependent manner.

Because of their common toothing with, for example, the drive pinion 17, both idler wheels 18.1 and 18.2 are always driven in the same direction of rotation as one another. Depending on this instantaneous direction of rotation, however, only the one or the other of the two idler wheels 18.1, 18.2 is in rotating connection with the gear shaft 20. This is so because the coupling takes place here via freewheels (22.1 and 22.2), which are inserted in opposition to one another between the idler wheels 18.1, 18.2 and the common gear shaft 20. In the instantaneous direction of rotation of the pinion 17, therefore, when the freewheel 22.1 is loaded in blocking direction via the idler wheel 18.1 for example, a connection to the gear shaft 20 that forces it to rotate together therewith exists here for this direction of rotation, and it is entrained by the idler wheel 18.1—whereas, for the other idler wheel 18.2, the freewheel 22.2 turns freely in this direction of rotation and vice versa.

Thus, depending on the direction of rotation of the pinion 17, either the one or the other of the two gears 14.1/14.2 is in action, in order, for example, to apply the utility function 23 slowly but with high torque or—after reversal of the direction of rotation—to release it again with with weaker torque and correspondingly higher rpm.

Since this release direction of rotation is always accompanied by lower necessary torque compared with the application, the gear 14.2 may be designed for torque to be transmitted that is lower due to higher starting rpm, with correspondingly adapted geometry of its toothings that mesh with one another, and, for example, also made from less strong materials; compared with the gear 14.1 for introduction of higher application force into the utility function 23.

Figure 2:
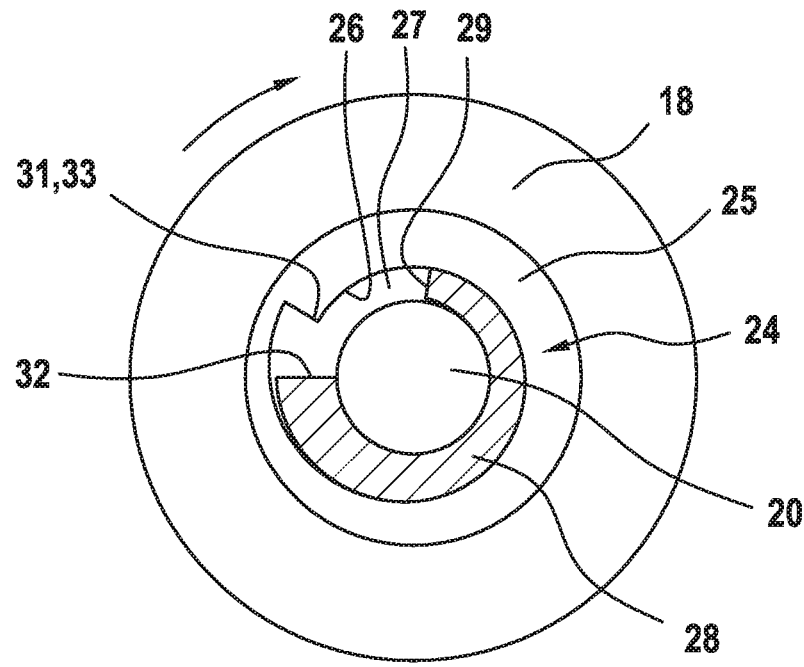
FIG. 2 shows, in cross section, a clamping-element freewheel with sickle-shaped cam in blocking or entraining coupling of the idler wheel to the gear shaft.
Figure 3:
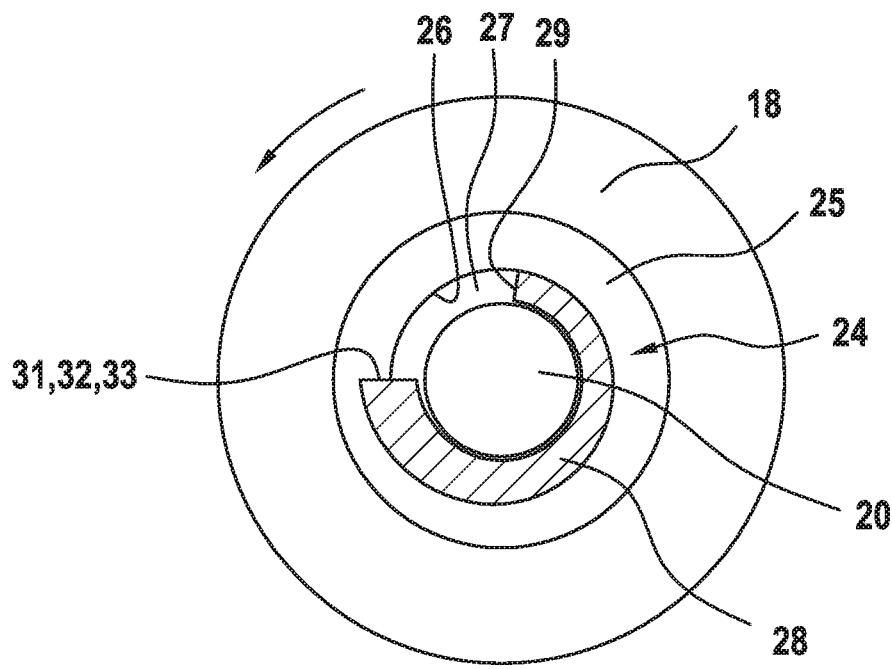
FIG. 3 shows the clamping-element freewheel according to FIG. 2 in opened or release position.

For the gear transmission in the actuator 11 in a manner dependent on the direction of rotation, a more inexpensive option than the installation of two parallel, oppositely oriented commercial needle freewheels according to FIG. 1 is the use of two oppositely oriented clamping-element freewheels 24 axially offset from one another in the respective hub 25 of each of the idler wheels 18, of which only one is included in the section plane of FIG. 2/FIG. 3. The outside diameter of the gear shaft 20 is much smaller than the inside diameter of an axial passage 26 in the hub 25 through which the gear shaft 20 passes and which is formed in one-part or multi-part manner with its idler wheel 18.1. In the axial annular space 27 thereby kept clear between gear shaft 20 and hub 25, a cam 28 made of injection-molded plastic is disposed as clamping element, embracing the gear shaft 20 in sickle-shaped manner with increasing radial thickness. Its thin end face 29 is fixed on the inside wall of the passage 26 of the idler wheel 18, which is likewise made of injection-molded plastic, or respectively on its hub 25, for example by being frictionally joined thereto or molded in one piece therewith. Starting from this linkage, the radial dimension of the cam 28 increases in the direction of its opposite unattached end face 32.

When the idler wheel 18 is turned in the direction relative to the gear shaft 20 such that the cam 28 extending in sickle-shaped curved manner is compressively loaded due to frictional interaction with the shell surface of the gear shaft 20 (FIG. 2), it becomes jammed in the annular space 27 between the passage 26 and the gear shaft 20, with the consequence that the gear shaft 20 is entrained by the idler wheel 18.

In contrast (FIG. 3), when the cam 28 is loaded in tension in the annular space 27 due to opposite direction of rotation of the idler wheel 18, then the said clamping in the annular space 27 is loosened thereby and the frictional connection of the idler wheel 18 to the gear shaft 20 is canceled. However, the gear shaft 20 is now entrained in this opposite direction of rotation by the other of the two idler wheels 18, which is equipped in a manner axially offset along the gear shaft 20 (therefore behind the plane of the drawing) with a clamping-element freewheel (24) in opposite direction of action, the cam (28) of which now becomes wedged in turn in the annular space (27) due to compressive loading in what is now the direction of rotation, in which thereby the gear shaft 20 is now entrained by the other idler wheel (18).

In the drawing, it is considered that it is expedient to equip the idler wheels 18 each with a stop 31 entrained in rotation, which, when the cam 28 is loaded in tension and therefore loosened in the annular space 27, comes into contact against its thicker, unattached end face 32. Due to the contact pressure, the inner curve of the sickle-shaped cam 28 is lifted from the shell surface of the gear shaft 20, in order now to cancel the previous entraining frictional interaction reliably here. As sketched, the stop 31 provided for this purpose is expediently designed simply as a centrifugal projection of the passage 26 and thus of the annular space 27 relatively close in front of the unattached end face 32 of the cam 28, which becomes peripherally braced against the shoulder 33 of the projection during release rotational movement of the idler wheel 18.

According to the invention, therefore, the gear 14 behind the reversible drive of two idler wheels 18 can be optimized kinetically, geometrically and in terms of material engineering by the fact that different step-down ratios become active according to the different torque requirement for application and for release, in a manner dependent on direction of rotation, of a utility function 23 such as a parking brake operated by an electric motor. For this purpose, two differently dimensioned step-down gears 14.1, 14.2 in engagement, for example, with a stepped motor pinion 17 via oppositely turning needle or clamping-element freewheels 22.1, 22.2; 24.1, 24.2 associated with them act on a common gear shaft 20. Depending on direction of rotation of the actuator motor 16 or similar drive, the gear shaft 20 acting on the power take-off 15 is thereby driven with different rpms, which therefore deliver correspondingly different torques. Because the same gear no longer acts equally in both directions of rotation, but in a manner determined in the design solely by the need for application torque, the sequence of release may now also be optimized, namely accelerated. Thereby a less powerful and therefore more inexpensive drive, for example a reversible motor 16, which with oppositely turning freewheels 22 work on common gear shaft 20, may be used for both powerful applications, since it is slower, on the one hand, and provides particularly rapid release on the other hand.

LIST OF REFERENCE SYMBOLS

11 Actuator
12 Casing (of 11)
13 Drive (in 11)
14 (Spur) gear (in 11)
15 Power take-off (of 11)
16 Motor (of 13, before 14)
17 Pinion (of 16)
18 Idler wheels (of 14)
19 Drive shaft (of 13)
20 Gear shaft (of 14)
21 Planetary gear (after 14)
22 (Needle) freewheels (between 18/25 and 20)
23 Utility function (behind 11)
24 (Clamping-element) freewheels (between 18/25 and 20)
25 Hub (of 18)
26 Bore (in 25/18)
27 Annular space (inside 26 opposite 20)
28 Cam (on 25/18 in 27)
29 (Fixed) end face (of 28, on 25/18)
30 -
31 Stop (in 25/27 for 32)
32 (Unattached) end face (of 28)
33 Shoulder (on 31 for 32)

The invention claimed is:

1. An actuator comprising:
   a drive having reversible first and second directions of rotation and comprising a drive wheel having a diameter stepped in an axial direction;
   a power take-off for operating a utility function;
   first and second idler wheels;
   a gear shaft;
   oppositely turning first and second freewheels disposed in oppositely turning manner between the first and second idler wheels and the gear shaft;
   a first gear rotationally connected to the power take-off via the oppositely turning first and second freewheels in a manner dependent on the first direction of rotation; and
   a second gear rotationally connected to the power take-off via the oppositely turning first and second freewheels in a manner dependent on the second direction of rotation;
   wherein the first and second idler wheels are offset axially relative to one another along the gear shaft, have different diameters, and mesh with the drive wheel; and
   wherein, for stepping down revolutions per minute to the power take-off, only one of the first and second gears is in rotating connection with the power take-off, via the oppositely turning first and second freewheels, depending on whether the drive is rotating in the first direction of rotation or the second direction of rotation.

2. The actuator according to claim 1, wherein the first and second gears have different step-down ratios.

3. The actuator according to claim 1, wherein the first and second idler wheels are adapted with respect to materials and/or tooth geometries to the torques that can be transmitted differently to the gear shaft in a manner dependent on the direction of rotation.

4. The actuator according to claim 1, wherein the gear shaft drives at least one further gear before the power take-off.

5. The actuator according to claim 4, wherein the further gear is a one-stage or multi-stage planetary gear.

6. The actuator according to claim 1, wherein the first and second freewheels comprise needle freewheels or clamping-element freewheels inserted between the first and second idler wheels and the gear shaft.

7. The actuator according to claim 1, wherein a cam, which embraces the gear shaft in sickle-like manner and is attached with one end face flexibly to the first or second idler wheel or a hub of the first or second idler wheel, is disposed as a clamping element in an annular space between the first or second idler wheel or the hub of the first or second idler wheel and the gear shaft.

8. An actuator comprising:
   a drive comprising a reversible direct-current motor having reversible first and second directions of rotation and a stepped pinion;
   a power take-off for operating a utility function;
   first and second idler wheels;
   a gear shaft;
   oppositely turning first and second freewheels disposed in oppositely turning manner between the first and second idler wheels and the gear shaft;
   a first gear rotationally connected to the power take-off via the oppositely turning first and second freewheels in a manner dependent on the first direction of rotation; and
   a second gear rotationally connected to the power take-off via the oppositely turning first and second freewheels in a manner dependent on the second direction of rotation;
   wherein the stepped pinion meshes with both of the first and second idler wheels; and
   wherein, for stepping down revolutions per minute to the power take-off, only one of the first and second gears is in rotating connection with the power take-off, via the oppositely turning first and second freewheels depending on whether the drive is rotating in the first direction of rotation or the second direction of rotation.

* * * * *